(12) United States Patent
Cobzaru

(10) Patent No.: US 6,719,510 B2
(45) Date of Patent: Apr. 13, 2004

(54) SELF-LOCKING FASTENER WITH THREADED SWAGEABLE COLLAR

(75) Inventor: Cristinel Ovidiu Cobzaru, Murrieta, CA (US)

(73) Assignee: Huck Patents, Inc., Wilmington, DE (US)

( * ) Notice: Subject to any disclaimer, the term of this patent is extended or adjusted under 35 U.S.C. 154(b) by 0 days.

(21) Appl. No.: 10/154,354

(22) Filed: May 23, 2002

(65) Prior Publication Data

US 2002/0176764 A1 Nov. 28, 2002

Related U.S. Application Data

(60) Provisional application No. 60/293,127, filed on May 23, 2001.

(51) Int. Cl.[7] ................................................ F16B 19/00
(52) U.S. Cl. ........................................ 411/361; 411/335
(58) Field of Search ........................ 411/333–336, 360, 411/361, 937.2

(56) References Cited

U.S. PATENT DOCUMENTS

| | | | | |
|---|---|---|---|---|
| 1,293,865 A | * | 2/1919 | Mueller | |
| 2,283,179 A | * | 5/1942 | Buckingham | |
| 3,254,690 A | * | 6/1966 | Neuschotz | |
| 3,750,732 A | * | 8/1973 | Moebius | |
| 3,805,863 A | * | 4/1974 | Starr | |
| 4,408,936 A | * | 10/1983 | Williamson | |
| 4,784,549 A | * | 11/1988 | Wing | |
| 4,983,084 A | * | 1/1991 | Gray | |
| 5,011,352 A | * | 4/1991 | Hatter | |
| 5,061,132 A | * | 10/1991 | Cosenza | |
| 5,125,778 A | * | 6/1992 | Sadri | |
| 5,562,379 A | * | 10/1996 | Rausch et al. | |
| 5,669,746 A | | 9/1997 | Myers et al. | |
| 6,019,559 A | | 2/2000 | Myers et al. | |

* cited by examiner

Primary Examiner—Flemming Saether
(74) Attorney, Agent, or Firm—Christie, Parker & Hale, LLP

(57) ABSTRACT

A fastener having a bolt and a threaded swageable collar. The bolt includes a head portion, a flange portion, and a shank portion which extends through two aligned apertures formed in adjacent panels. The shank portion includes a threaded gripping portion and a locking groove adjacent to the gripping portion. The collar is cylindrical having an internally threaded section and a swaging section whereby the collar is fastened to the bolt by threading the threaded section of the collar onto the threaded gripping section of the bolt and swaging the swage portion of the collar into the locking groove of the bolt.

17 Claims, 3 Drawing Sheets

SELF-LOCKING FASTENER WITH THREADED SWAGEABLE COLLAR

CROSS-REFERENCE TO RELATED APPLICATION(S)

This application claims priority from U.S. Provisional Application No. 60/293,127 filed May 23, 2001.

FIELD OF THE INVENTION

The present invention relates to fasteners, and more particularly to a fastener including a bolt and a threaded swageable collar.

BACKGROUND OF THE INVENTION

A type of fastener widely utilized in the aerospace industry typically comprises a bolt having a head, shank and pin tail portions. The shank portion extends through aligned apertures formed in adjacent panels, wherein the shank portion typically includes a single gripping ledge formed thereon. A collar is swaged onto the shank portion in a manner such that the collar is secured to the gripping ledge in place against a surface of one of the panels.

The male fastener, also called a "stud" or "bolt", is designed to be reusable such that the swaged-on collar the female part of this fastening system is removed by using a special tool. The removal process implies destroying the swaged-on collar by a tool having two jaws that forces the collar end to break open. During the removal process the single gripping ledge on the male fastener could be damaged thus preventing the fastener stud from being reused. The existing conventional fastener using a swaged-on collar was improved by the present applicant as shown in U.S. Pat. Nos. 5,669,746 and 6,019,559 which disclose a fastener comprising a head portion, a flange portion, a shank portion which extends through aligned apertures formed in adjacent panels, and a collar swaged on the shank portion of the fastener. The shank portion comprises a plurality of gripping surfaces having angled surfaces formed between a plurality of spiral grooves. The female part of this fastening system, named "collar" is first positioned over the end of the shank portion and an installation tool then swages the collar thereon. The collar is tightly held by multiple gripping surfaces, thereby preventing movement in the direction of the longitudinal axis of the fastener. When the collar is swaged onto the fastener shank portion, mating spiral grooves are formed along the interior surface of the collar. It is important to mention that in the existing fastener as well as in the one described by the above mentioned patents, the male fasteners (stud) is used in the installation process as a forming tool, intended to form the spiral groove into the collar. In order for the installation to be successful and meet all application requirements, the bolt needs to be manufactured from a material much harder than the collar material.

In order to remove the collar from the fastener shank portion, a tool having pivotal jaw members is positioned in the space formed between the bottom surface of the shank portion and the overhanging portion of the swaged collar, the jaw members being forced apart which, in turn, forces the collar to expand outwardly from the shank portion. During this expansion, the collar material is supposed to fracture, exposing the tail portion of the bolt. A tool then engages the collar, the collar being removed when the tool rotates, or spins, in the clockwise direction, pushed out by the helical groove formed in the collar by the male fastener at installation. The process of collar removal after it has been forced open, can be best described as "threading the collar out". The fastener disclosed in these patents provided a swaged collar to be quickly and easily removed while not damaging the gripping surfaces formed on the fastener shank portion, thus increasing the fastener reusability and decreasing the disassembly down time, in turn providing significant cost savings.

However, under certain performance criteria the prior art fastener described in the above mentioned U.S. patents was subject to problems. Specifically when the male fastener (stud) material was not hard enough, or was subjected to temperatures beyond the transformation point of the fastener material, as high as 2300° F., the performance of the fastener could not meet the application requirements. Such applications exist when used, for example, in the exhaust systems for F-22 engines. The prior art fastener design was also highly susceptible to operator errors during installation, and the installation pre-load could not be controlled, causing rejections and excessive re-work. During the removal process, after being split open by a special tool, the collar needs to be pushed out of the stud, by using the spiral grooves formed inside of the collar during the installation process. In some cases, especially when the stud material is softened by exposure at high temperatures, the spiral groove is not formed well enough to give a positive axial force towards unthreading the collar, stripping before the collar is pushed out of the stud. In cases like this, the collar needs to be removed by other means, and in the removal process the stud may get damaged. Other problems with the prior art design included low or no re-usability because of the potential problems described previously, low or no pre-loads, faulty installations due to tool misalignment with the fastener during installation and a high standard of deviation of the load capability of the installed fastener.

Therefore, it is desired to provide an improved fastener which incorporates a threaded swageable collar which eliminates the problems associated with previous designs and is usable even when manufactured from softer, lighter materials, and in all conditions such as, for example, in temperatures beyond the transformation point.

SUMMARY OF THE INVENTION

As shown in FIGS. 1 and 2, the present invention provides an improved fastener comprising a male part of the system 12, named bolt or stud (depending on the application) having a head portion, a flange portion, a shank portion capable of extending through aligned apertures formed in adjacent panels, and a female part of the system 14, a threaded collar for receipt on the shank portion of the fastener. The shank portion of the male fastener presents a high strength thread 22 to provide a plurality of gripping surfaces having angled surfaces form between a plurality of spiral grooves. The female part of the system, named "collar" has a plurality of mating internal threads 36 and is positioned over the end of the shank portion and threaded onto the shank until a certain installation torque is reached, accurately controlling the installation pre-load of the fastener. The end of the collar is then swaged over a locking groove 26 on the end of the shank to positively lock the collar 14 onto the shank of the stud 12.

The threaded portion 22 on the shank of the male part 12 of the fastening system, in combination with the internal threads 36 on the collar 14 provides the desired installation pre-load and the majority of the axial load capability. By comparison, on the previous art fastener, the load carrying capability was given by both the spiral groove and by the swaged portion at a ratio of almost 50% each. Because of this, in cases when the stud material was softened by exposure to very high temperatures, the installed system lost almost a half of the load capability. It also provides the axial force required during the removal of the collar. The length of the threaded portion 22 of the male part of the fastening system (stud or bolt) is established by the maximum designed grip range. The locking groove 26 on the end of the shank is designed to provide good material flow during swaging. A locking shoulder 28 is positioned behind the groove and is designed to provide maximum anti-rotational resistance of the collar after installation, as well as easy removal of the collar 14.

Likewise, as shown in FIG. 2, the length of the threaded portion 36 on the internal diameter of the collar is established by the load requirements and is constant for different grip ranges. The length of the swaging portion 38 of the collar 14 is directly dependent on the design maximum grip capability (thickness of the panels to be fastened) of the fastening system. The material thickness of the swaging portion 38 is computed such as to provide the desired anti-rotational, vibratory and axial load resistance as well as to provide good material flow. As shown in FIG. 3, located on the end 14A of the collar adjacent the swaging portion are two recesses or notches 40, used at installation to thread the collar until it meets the desired installation pre-load. This feature also aids in the removal process of the collar providing the expected re-usability of the male fastener (stud or bolt).

The fastening system of the present invention differs fundamentally from prior art in that prior fastener designs relied on the bolt to act as a mandrel, forming a spiral groove inside of the collar during the swaging process. This approach made the performance of the system very susceptible to hardness and dimensional variations making the installation on softer bolts unreliable or even impossible. The present invention does not use the stud 12 (or bolt) as a mandrel (or forming tool) during installation, so exposure to high temperatures during processing or in the application, and use of softer bolts has little effect on the performance and re-usability of the system.

DETAILED DESCRIPTION OF THE INVENTION

Figure 1:
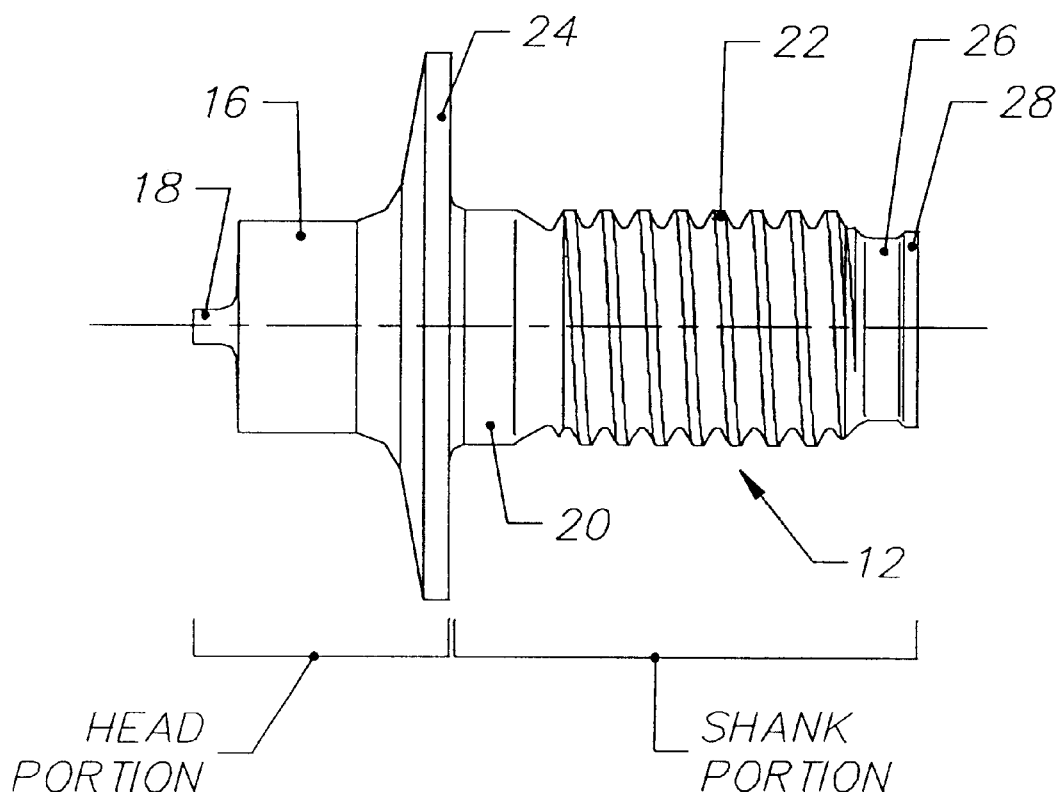
FIG. 1 is a side view of the male fastener of the present invention (named stud or bolt)

As shown in FIGS. 1–4 a fastener 10 of the present invention comprises a bolt 12 and a collar 14. In FIG. 1, the bolt 12 includes a head portion, and a shank portion. In the presented embodiment, the head portion is comprised by a spacing portion 16 having a weld tip 18 formed thereon, and a flange portion 24. It is to be understood that this head form is one possible embodiment of this fastener. In other applications, the head portion may have any desired form, such as hex head, standard recessed drive head, etc.

The shank portion of the bolt comprises a threadless shank portion 20, and a high strength threaded gripping section 22. Positioned on the side of the threaded portion which is opposite to the head side, is a locking groove 26 which terminates into a locking shoulder 28. The locking groove 26 has a diameter smaller than the threaded gripping section 22 as well as smaller than the diameter of the locking shoulder 28. Typically, the locking shoulder 28 has a diameter which is smaller than the minor diameter of the threaded gripping section 22.

Figure 2:
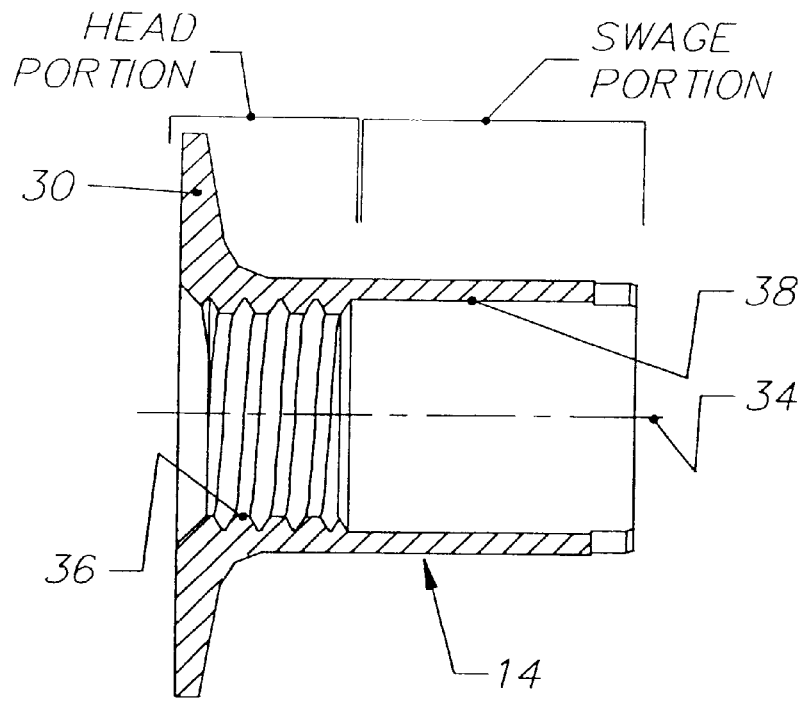
FIG. 2 is a side cross-sectional view of the fastener collar portion of the present invention.
Figure 3:
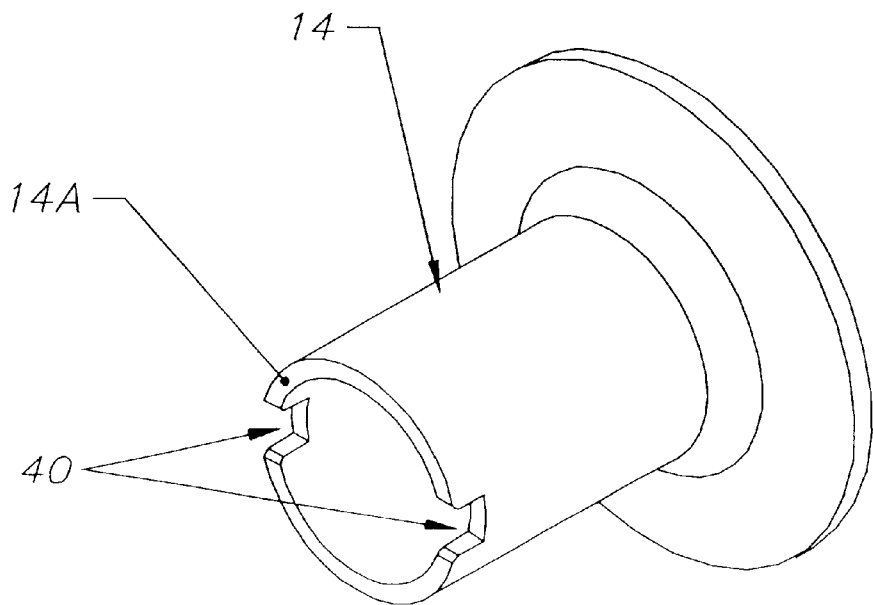
FIG. 3 is a perspective view of the collar of FIG. 2.

As seen best in FIGS. 2 and 3, collar 14 comprises a threaded portion 36 and a swaging portion 38. In the presented embodiment, the threaded portion of the collar is cylindrical having a flange portion 30 and an aperture 32 extending along the longitudinal axis 34 of the collar. Located along the aperture is a threaded portion 36. It is to be understood that the shape of this threaded portion can have any shape desired or demanded by any specific application, including for example a hexagonal shape.

The swage area 38, comprises a smooth cylindrical outside diameter, and an inside cylindrical diameter. The thickness of the material depends on the collar material used, to provide easy material flow at installation and the desired resistance to unthreading after installation. Positioned on the end 14A of the swaged area are two notches 40 used to drive the collar when threading it in, as will be discussed in more detail subsequently.

Figure 4:
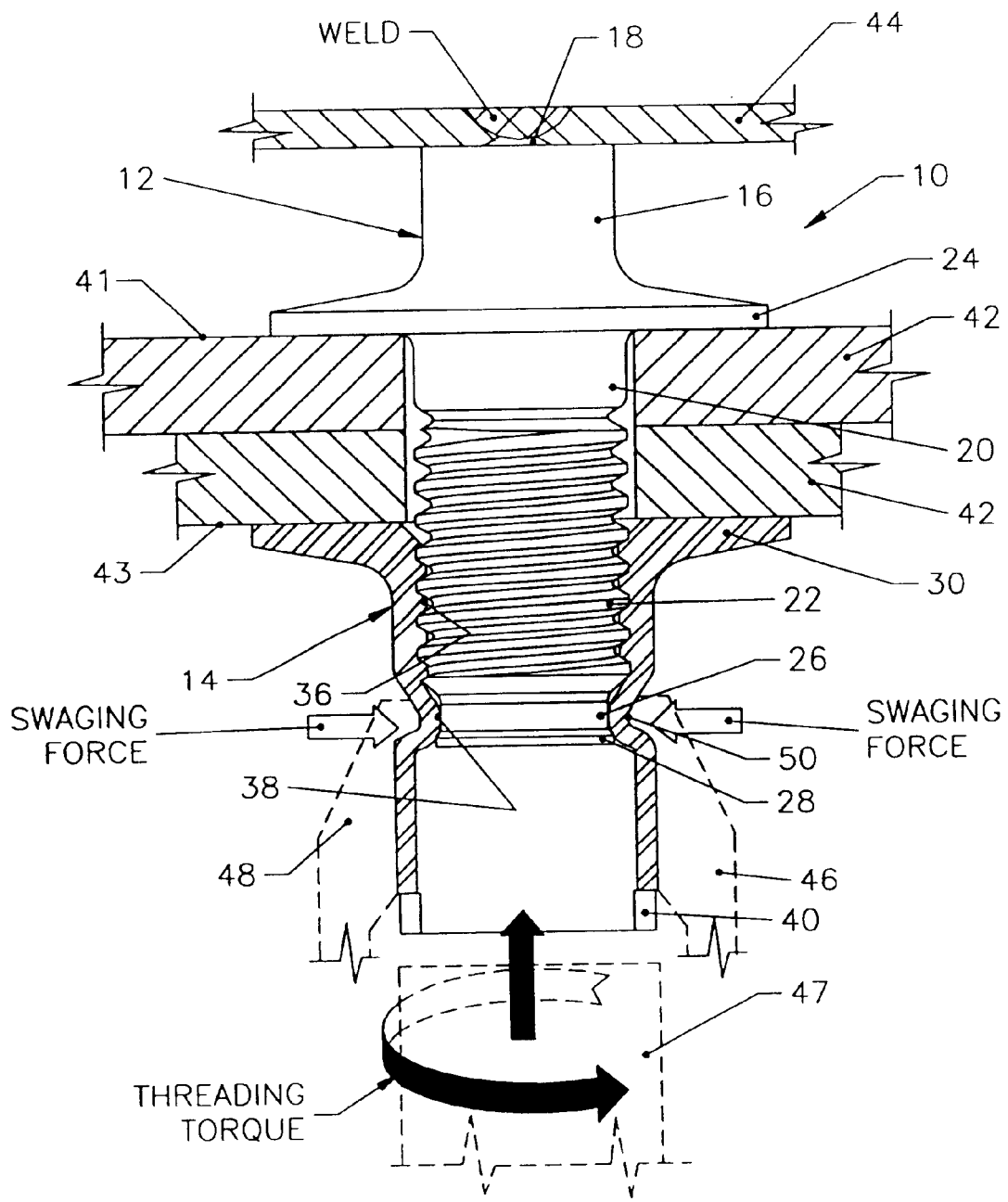
FIG. 4 illustrates the fastener as installed in an application.

FIG. 4 illustrates the fastener 10 of the present invention in its installed condition. In the example shown in FIG. 4, the fastener 10 is used to attach panel 42 to panel 44. It should be understood that this is only one example to which the fastener 10 could be utilized. In this example, bolt 12 is inserted through an aperture in panel 42 (panel 42 actually is two overlapping panels) and collar 14 is threaded onto the bolt such that the flange 24 of head 16 is positioned on one side 41 of the panel and flange 30 of the collar 14 is positioned on the opposite side 43 of panel 42. In this example, the weld tip 14 is melted during a welding process which secures the head portion 16 to panel 44. The typical sequence is that after the head portion 16 is secured to panel 44, shank portion 20 is positioned to extend through the apertures formed in panel 42 and the collar 14 is then threaded onto the threaded gripping section 22 so that the threaded portion 36 of the collar engages the threaded gripping section 22. The collar is threaded onto the bolt by a driver 47 which engages the notches 40 on the end of the collar. Once the collar is firmly seated against the panel 42 and reached the desired seating torque, jaw portions 46 and 48 of the installation tool are positioned over the swage area 38 of the collar and then forced together causing the metal of the swage area to start to flow into the locking groove 26. The collar is swaged to the bolt in the locking groove between the end of the threaded portion and the locking shoulder 28. An annular groove 50 is formed on the outer surface of the swage area after the collar has been completely installed.

The fastener 10 of the present invention carries approximately 90% to 95% of the load capability on the threads, wherein the swage of the collar is only a locking feature. The diameter and the shape of the end of the bolt permits the installation tool to support and protect the locking shoulder during swaging. The same feature allows the removal tool to access the swaged area of the collar, protecting the bolt at the same time. The notches at the end of the collar will be stress concentrators during collar removal, forcing the collar to break into two halves, exposing the locking shoulder. The threads on the collar push the collar out when un-threading, without damaging the bolt, thus providing for the reusability of the bolt. The problem of low or no pre-loads is completely eliminated since the pre-load is controlled by the collar installation torque. The effect of faulty installations due to swage tool misalignment are considerably reduced since the fastener tool load capability is driven by the threads which are self-aligning, and the locking groove is designed in such that it is protected by the swage tool during the swage process. The swage tool presents an internal stop screw mechanism designed in close tolerance with the internal diameter 38 of the swage portion of the collar. This diameter is bigger than the diameter of the locking shoulder 28 of the male fastener, and fully protects this feature during the swaging process. Also this close tolerance of the internal stop screw mechanism with the swage diameter 38 helps the operator align the swage tool with the already threaded fastener. The high standard of deviation of the load capability problem is also reduced since the majority of the load capacity is carried by the threads, which are not influenced by any operator or installation errors. On the prior art design, the load capability of the fastener was controlled by the amount of swaging produced during installation, the smaller the swaging diameter, the higher the swage force, resulting in higher load capability of the installed fastener. Because of that, especially when the male fastener was exposed to high temperatures, the user preferred to choose the smallest swage diameter possible, below the recommended range, in order to make up for the loss of load capability due to the softening of the fastener. This practice can cause irreversible damage to the male fastener, as well as short tool life.

The subject of this invention, due to the fact that the load capability is not influenced by any means by the swaging diameter and force, makes it unnecessary to reduce the swage diameter in order to achieve a satisfactory level of performance. By way of example, for the presented embodiment, the fastener of the present invention will have a minimum pull load of 500 lbs. with an operating temperature up to 900° F. The fastener will have at a minimum 5 cycle reusability including the initial installation even when exposed to high temperatures. The required pre-load should be in the range of 0–65 lbs. The maximum removal torque required would be 30 in.-lbs.

While the invention has been described with reference to one embodiment, it would be understood by those skilled in the art that various changes may be made and equivalence may be substituted for elements thereof without departing from the true spirit and scope of the invention. In addition, many modifications may be made to adapt a particular situation or material to the teaching of the invention without departing from its essential teachings as hereinafter claimed.

What is claimed is:

1. A fastener comprising:
    a bolt having a head and a shank extending axially from the head,
        the shank having a smooth section and a threaded gripping section having a at least one helical thread having a trunctuated vent angled surfaces formed between a spiral groove,
        the shank further having a locking groove adjacent the threaded gripping portion and a locking shoulder adjacent the locking groove opposite the threaded gripping section, each of the locking groove and the locking shoulder having a diameter smaller than a minor diameter of the threads in the threaded gripping section; and
    a cylindrical collar having a threaded portion having a thread shaped to mate with the thread on the shank and having a swage portion, the swage portion having an end opposite the threaded portion,
    whereby the collar is fastened to the bolt by threading the threaded portion of the collar onto the threaded gripping section of the bolt and swaging the swage portion of the collar into the locking groove of the bolt, whereby the end of the collar extends beyond the locking shoulder of the shank and wherein approximately 90 to 95 percent of a load capability of the fastener is carried by the threaded gripping section of the shank and the threaded portion of the collar.

2. The fastener of claim 1 wherein the collar further includes notches formed in the end of the swage portion for use in threading the collar onto the bolt.

3. The fastener of claim 1 wherein the bolt and the collar each have a flange.

4. The fastener of claim 1 having a minimum pull load of 500 lbs.

5. The fastener of claim 1 having an operating temperature up to 900°F.

6. The fastener of claim 1 having a pre-load force in the range of 0 to 65 lbs.

7. The fastener of claim 1 having a removal torque of 30 in.-lbs.

8. A method of fastening panels with a fastener comprising the steps of:
    inserting a bolt having a head portion and a threaded shank portion having at least one helical thread having a truncated crest and angled surfaces formed between a spiral groove through aligned apertures in overlapping panels until the head portion engages a first surface of the overlapping panels;
    threading a cylindrical collar having a threaded portion having a thread shaped to mate with the thread on the shank and a swage portion onto the threaded shank portion until the threaded portion of the collar engages a second surface of the panels opposite the first surface;
    swaging the swage portion of the collar into a locking groove of the bolt adjacent the threaded shank portion by forming an annular groove in the swage portion; and
    carrying 90 to 95 percent of load on the fastener by the threaded shank portion of the bolt and the threaded portion of the collar.

9. The method of claim 8 wherein the step of threading the collar includes inserting a driver into slots on an end of the swage portion and rotating the driver.

10. A fastener assembly comprising:
    a bolt having a head and a shank extending axially from the head;
    the shank having at least one helical thread having a truncated crest and a threaded gripping section having angled surfaces formed between a spiral groove and a locking groove adjacent the threaded gripping section; and
    a cylindrical collar having a threaded portion on the inside diameter of the collar having a thread shaped to mate with the thread on the shank and a swaging portion adjacent the threaded portion,
    the swaging portion having at least one driving notch for rotating the collar onto the shank and extending beyond an end of the shank when the collar is in the installed position on the shank, wherein 90 to 95 percent of a load capability of the fastener assemble is carried by the threaded gripping section of the shank and the threaded portion of the cylindrical collar.

11. The fastener assembly of claim 10 further comprising at least two driving notches located on an end of the collar in the swage portion.

12. The fastener assembly of claim 10 wherein the head of the bolt includes an enlarged flange and the collar threaded section also has an enlarged flange between which overlapping panels are positioned.

13. The fastener assembly of claim 10 wherein the shank of the bolt includes a non-threaded portion and a locking shoulder adjacent the locking groove opposite the threaded gripping section.

14. The fastener system of claim 10 having a minimum pull load of 500 lbs.

15. The fastener system of claim 10 having an operating temperature up to 900°F.

16. The fastener system of claim 10 having a pre-load force in the range of 0 to 65 lbs.

17. The fastener system of claim 10 having a removal torque of 30 in.-lbs.

* * * * *

UNITED STATES PATENT AND TRADEMARK OFFICE
CERTIFICATE OF CORRECTION

PATENT NO. : 6,719,510 B2
DATED : April 13, 2004
INVENTOR(S) : Cristinel Ovidiu Cobzaru It is certified that error appears in the above-identified patent and that said Letters Patent is hereby corrected as shown below:

Column 5,
Line 5, delete "a".
Line 6, delete "trunctuated vent" and substitute therefor -- truncated crest and --.

Column 6,
Line 17, delete "assemble" and substitute therefor -- assembly --.

Signed and Sealed this

Twenty-ninth Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,719,510 B2
DATED : April 13, 2004
INVENTOR(S) : Cristinel Ovidiu Cobzaru It is certified that error appears in the above-identified patent and that said Letters Patent is hereby corrected as shown below:

Column 5,
Line 52, delete "a".
Line 53, delete "trunctuated vent" and substitute therefor -- truncated crest and --.

Column 6,
Line 60, delete "assemble" and substitute therefor -- assembly --.

This certificate supersedes Certificate of Correction issued June 29, 2004.

Signed and Sealed this

Twenty-eighth Day of December, 2004

JON W. DUDAS
*Director of the United States Patent and Trademark Office*